May 7, 1935.   O. H. RENFRO   2,000,036
TIRE MOUNTING MACHINE
Filed May 31, 1933   2 Sheets-Sheet 1

INVENTOR
O. H. RENFRO
BY Hazard & Miller
ATTORNEYS

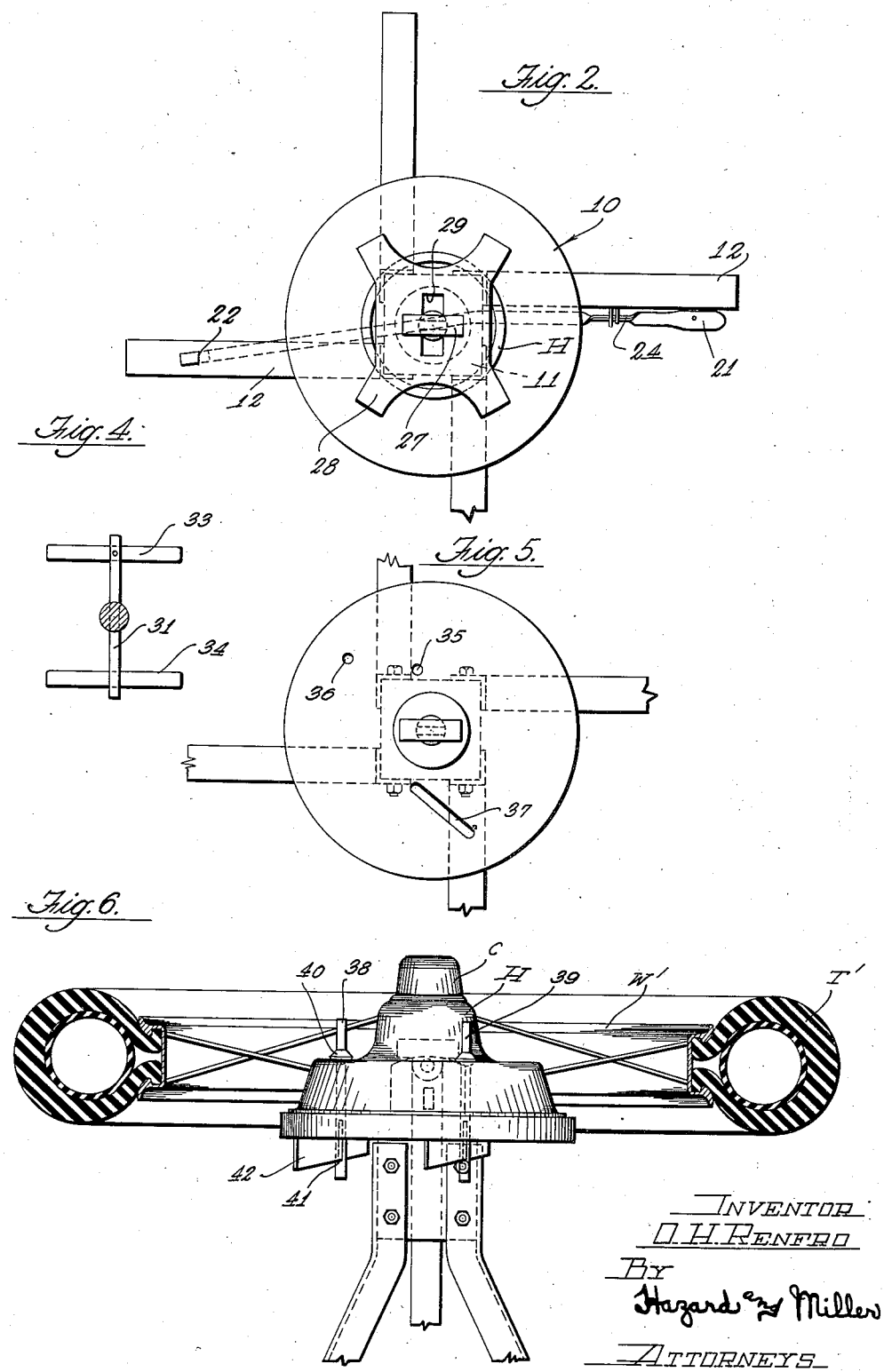

Patented May 7, 1935

2,000,036

UNITED STATES PATENT OFFICE 2,000,036

TIRE MOUNTING MACHINE

O. H. Renfro, South Gate, Calif.

Application May 31, 1933, Serial No. 673,676

5 Claims. (Cl. 144—288)

This invention relates to improvements in tire mounting machines.

An object of the invention is to provide a construction on which a vehicle wheel, such as an automobile wheel, can be easily mounted to facilitate removal and replacement of tires thereon. Recently a new type of tire has been placed on the market generally known as an "air wheel". This type of tire is extremely large as compared with its circumference and is much larger than the conventional balloon tire. The size of the tire causes the wheel on which the tire is to be mounted to be made very small with the result that when it is necessary to remove or replace tires on these extremely small wheels difficulty is encountered in so doing. It is extremely difficult to remove and replace the tire on the wheel while the wheel remains on the car and the customary practice is to remove the wheel from the car before attempting to remove the tire from the wheel. Inasmuch as the wheels are very small, difficulty is encountered in grasping the wheel in such a manner as to enable an easy removal of the tire therefrom. The improved construction has been primarily designed to enable the wheel to be clamped in a stationary position in such a manner as to enable the tire to be easily removed and easily replaced.

Another object of the invention is to so design a construction of this character that it may receive wheels of the various shapes and designs which are now conventionally used on automobiles. In other words it is the intention that the improved construction be of universal application to the various types of wheels now used and which carry these unusually large size tires.

With the foregoing and other objects in view, which will be made manifest in the following detailed description, and specifically pointed out in the appended claims, reference is had to the accompanying drawings for an illustrative embodiment of the invention, wherein:

Fig. 2 is a top plan view of the machine, the wheel and tire being shown as having been removed therefrom.

Fig. 4 is a view illustrating a modified type of clamping head, which may be used to bear a clamp upon forms of wheels that require this type of construction.

Fig. 5 is a view similar to Figure 2, illustrating the clamping construction shown on Figure 2 as having been removed therefrom and parts of the construction rendering it adaptable to the type of wheel shown on Figure 6.

Fig. 6 illustrates the manner in which the construction shown in detail in Figure 5 is used on a wheel which does not have a removable hub cap.

Figure 3:
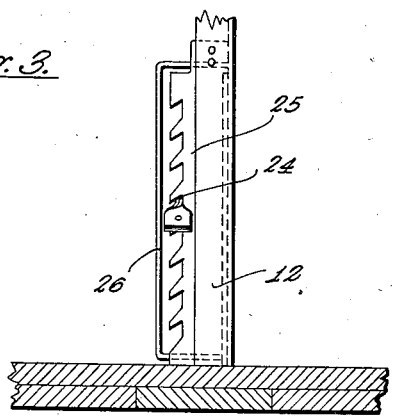
Fig. 3 is a sectional view taken substantially upon the line 3—3 upon Figure 1 in the direction indicated.

Referring to the accompanying drawings, wherein similar reference characters designate similar parts throughout, the improved tire mounting machine comprises a circular table 10 having a rectangular or square projection 11 on the under side thereof at about its center. Legs 12, which may be formed of angle irons, are secured to this projection and serve to support the table. These legs preferably are secured to the corners of the projection as by bolts 13 and may be bolted to the floor, as indicated, by bolts 14. On the top of the table there is preferably a central cylindrical upstanding projection 15. A central bore 16 extends through the table and a clamping rod 17 is slidable therein. This clamping rod has a link 18 pivotally secured as at 19 to its lower end and this link in turn is connected as at 20 to a yieldable or bendable lever 21. This lever is fulcrumed as at 22 on one of the legs 12 and has its swinging ends twisted as at 23 to present an upstanding edge 24, see Figure 3, which is receivable in any one of the teeth of a ratchet bar 25. Ratchet bar 25 is fastened to one of the legs 12 and lever 21 is kept adjacent it by means of a guard 26. At the upper end of clamping rod 17 there is a pivoted head 27 and beneath this there is provided a hub spanning member 28. This hub spanning member is of concavo-convex shape, as clearly shown on Figure 1, and has the outline shown on Figure 2. It has an elongated slot 29 formed centrally thereof through which head 27 can be passed. As a means for lifting lever 21, link 18 and clamping rod 17, when lever 21 is disengaged from the ratchet, a suitable spring 30 may be used to connect the link 18 with one of the legs 12.

Figure 1:
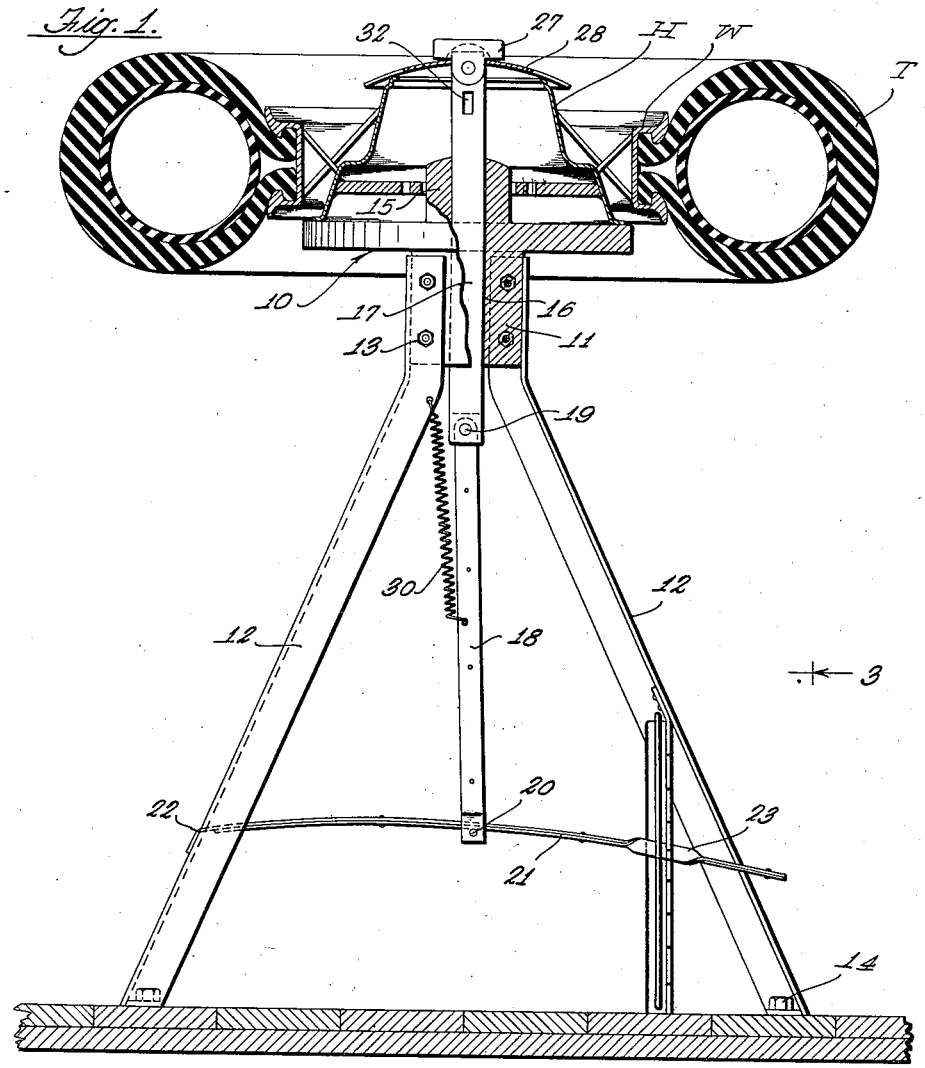
Fig. 1 is a view in side elevation, parts being broken away and shown in section, illustrating the improved tire mounting machine.

The operation and advantages of the above described construction are as follows. When it is desired to remove tire T from wheel W, having hub H, the wheel is first placed on table 10 with its hub over the projection 15 on the table and with the clamping rod 17 extending up through the wheel. The spanning member 28 is then slipped over the head 27 and is given a ninety degree rotation so as to position the spanning member with respect to head 27 in the manner shown on Figure 2. The operator then steps on the outer end of lever 21, swinging this lever downwardly about the point 22 as the center. This pulls the head 27 into engagement with the spanning member. As the spanning member is preferably formed of spring steel, it gives slightly when tension is applied to the clamping rod 17. The weight of the operator on the resilient lever 21 flexes this lever, as shown in Figure 1, and when the wheel has been tightly clamped by the spanning member 28 against the table 10, lever 21 is swung into engagement with one of the ratchet teeth on the ratchet bar 25. In this way the flexing of the lever 21 maintains a tension on clamping rod 17, holding the wheel W tightly against the table as long as the ratchet is engaged. When the wheel is thus clamped, it is possible to remove the tire T quite easily in the conventional manner. Upon replacing the tire, disengagement of the lever from the ratchet releases the wheel and enables spanning member 28 to be reversely turned so that it may be slipped over head 27. The wheel can then be removed from the table.

It will be noted the construction is such that in clamping the wheel against the table, the hub is so engaged that the finish thereon will not be marred in any way.

With some types of wheels because of the nature of various hub constructions it is desirable to have a different style of spanning member. To this end the construction is equipped with a separate spanning member as shown on Figure 4. This merely consists of a transverse bar 31, which may be caused to slide through slot 32 in the top of clamping rod 17. Fastened to one end of this bar is a transverse bar 33 which rests on the hub. A separate bar 34, which is a counterpart of bar 33, is merely positioned beneath the opposite end of bar 31 and is held down against the hub by bar 31 being clamped thereagainst. This form of spanning means is more advantageously employed on certain styles of wheel construction than the spanning means disclosed at 28.

Some styles of wheel construction now being employed are similar to that shown on Figure 6 wherein the tire T' is mounted on wheel W' having a hub H' with a permanently attached hub cap C. It is desirable to be able to use the same construction for fastening a wheel of this character in place while the tire is being removed. In this style of wheel, the hub is usually provided with a plurality of apertures therethrough for the reception of lug bolts for fastening the wheel in place on the vehicle. I take advantage of this construction and form two apertures 35 and 36 which extend through the table. These apertures are located at different radial distances from the center of the table. On the opposite side of the table there is formed a diagonal slot 37. When a small sized wheel is to be mounted on the table, its hub is positioned over the upstanding central projection 15 and a special clamping bolt 38 is dropped through one of the apertures in the hub and into the aperture 35 in the table, as this is the aperture nearest the center. A similar clamping bolt 39 is dropped through another aperture in the hub and through the slot 37. By adjustment of the wheel with respect to the table about aperture 35 as a center, bolt 39 can be properly dropped in the slot. The two bolts 38 and 39 have shoulders 40 formed thereon which engage the top or outer side of the hub. Their lower ends are longitudinally slotted as at 41 to receive tapered wedges 42 which are driven therethrough. When the wedges are driven, they clamp the wheel in position on the table, in which position the tire can be removed and replaced. In the event that a wheel having a larger sized hub is to have its tire removed and replaced, bolt 38 instead of being dropped through aperture 35 is dropped through aperture 36, which is a greater distance from the center of the table. Bolt 39 is dropped through an aperture in the hub and through slot 37. The slot enables adjustments of the various parts to accommodate the wheels of various sizes.

From the above described construction it will be appreciated that a novel and advantageous tire mounting machine is provided, which enables the clamping of a wheel in place against the table or face plate 10. The wheel is clamped by means of the hub in such a manner as not to mar the paint or finish and a tension is continually maintained to hold the wheel in place. With the wheel thus stationarily mounted, there is free access to the tire, enabling it to be easily removed from the wheel and to be replaced.

Various changes may be made in the details of construction without departing from the spirit or scope of the invention as defined by the appended claims.

I claim:

1. A tire mounting macine comprising means providing a surface against which a wheel may be positioned, means movable through the surface adapted to be extended through the hub of the wheel, a spanning means adapted to be connected to said movable means and caused thereby to press the wheel against the surface, means for imposing a tension upon the movable means including a bendable lever, and means for releasably holding the lever depressed.

2. A tire mounting machine comprising means providing a table against which a wheel may be positioned, a clamping rod slidable through the table having a head, a spanning means adapted to be connected to the head and caused thereby to press the wheel against the table, a bendable lever, means connecting the clamping rod and bendable lever, and ratchet means for holding the lever depressed.

3. A tire mounting machine comprising means providing a table upon which a wheel may be positioned with its tire disposed outwardly of and beyond the edge of the table, a clamping rod slidably extending through the table and normally extending thereabove so as to be extended through the hub of the wheel, spanning means associated with the upper end of the clamping rod by which the wheel may be clamped solidly against the table, and means for imposing a downward tension on the clamping rod to cause it to clamp the wheel solidly against the table.

4. A tire mounting machine comprising means providing a table upon which a wheel may be positioned with its tire disposed outwardly of and beyond the edge of the table, a clamping rod slidably extending through the table and normally extending thereabove so as to be extended through the hub of the wheel, spanning means associated with the upper end of the clamping rod by which the wheel may be clamped solidly against the table, means for imposing a downward tension on the clamping rod to cause it to clamp the wheel solidly against the table, a bendable lever fulcrumed adjacent one end and having ratchet means releasably holding the other end in position, and a link pivotally connected to the clamping rod and lever whereby the clamping rod may be pulled downwardly to clamp the wheel solidly against the table.

5. A tire mounting machine comprising means providing a table upon which a wheel may be positioned with its tire disposed outwardly of and beyond the edge of the table, a clamping rod slidably extending through the table and normally extending thereabove so as to be extended through the hub of the wheel, spanning means associated with the upper end of the clamping rod by which the wheel may be clamped solidly against the table, means for imposing a downward tension on the clamping rod to cause it to clamp the wheel solidly against the table, a bendable lever fulcrumed adjacent one end and having ratchet means releasably holding the other end in position, a link pivotally connected to the clamping rod and lever whereby the clamping rod may be pulled downwardly to clamp the wheel solidly against the table, and spring means urging the clamping rod, link, and lever into uppermost positions.

O. H. RENFRO.